United States Patent [19]

Hayashi

[11] Patent Number: 4,828,066
[45] Date of Patent: May 9, 1989

[54] CONTROL APPARATUS FOR ELECTRICALLY DRIVEN POWER STEERING SYSTEM FOR A FORK LIFT TRUCK

[75] Inventor: Takashi Hayashi, Kariya, Japan

[73] Assignee: Kabushiki Kaisha Toyoda Jidoshokki Seisakusho, Kariya, Japan

[21] Appl. No.: 104,104

[22] Filed: Oct. 5, 1987

[30] Foreign Application Priority Data

Oct. 18, 1986 [JP] Japan ................................ 61-248166

[51] Int. Cl.$^4$ .......................... B62D 5/04; B62D 6/00
[52] U.S. Cl. ................................... 180/142; 180/79.1
[58] Field of Search ....................... 180/79.1, 141, 142, 180/143; 364/424

[56] References Cited

U.S. PATENT DOCUMENTS

| | | | |
|---|---|---|---|
| 4,626,994 | 12/1986 | Yabe | 180/142 |
| 4,637,483 | 1/1987 | Eto | 180/141 |
| 4,676,331 | 6/1987 | Iwaki | 180/79.1 |

FOREIGN PATENT DOCUMENTS

| | | | |
|---|---|---|---|
| 3504561 | 11/1985 | Fed. Rep. of Germany | 180/79.1 |
| 2579547 | 10/1986 | France | 180/79.1 |
| 79753 | 6/1980 | Japan | 180/141 |
| 79754 | 6/1980 | Japan | 180/142 |
| 60376 | 3/1986 | Japan | 180/142 |
| 2170157 | 7/1986 | United Kingdom | 180/79.1 |

*Primary Examiner*—Charles A. Marmor
*Assistant Examiner*—Everett G. Diederiks, Jr.
*Attorney, Agent, or Firm*—Brooks Haidt Haffner & Delahunty

[57] ABSTRACT

A control apparatus for an electrically driven power steering system for a fork lift truck includes a torque sensor for generating torque signals when a steering torque is applied to the steering wheel, a load weight sensor for generating load weight signals corresponding to the load weight placed on the truck and a control circuit for supplying a driving torque to the steering assist motor in accordance with steering assist characteristics determined in accordance with the aforementioned torque signals and load weight signals. The control apparatus may also include a vehicle speed sensor so that the steering assist characteristics will be determined with the vehicle speed simultaneously taken into account.

8 Claims, 6 Drawing Sheets

CONTROL APPARATUS FOR ELECTRICALLY DRIVEN POWER STEERING SYSTEM FOR A FORK LIFT TRUCK

BACKGROUND OF THE INVENTION

1. Field of the Invention

This invention relates to a control apparatus for an electrically driven power steering system mounted on a fork lift truck.

2. Related Art Statement

An illustrative electrically driven power steering system mounted on a fork lift truck is disclosed for example in a Japanese Laid-open Utility Model Publication No. 107682/1986 corresponding to U.S. Pat. No. 4,676,331.

Figure 1:
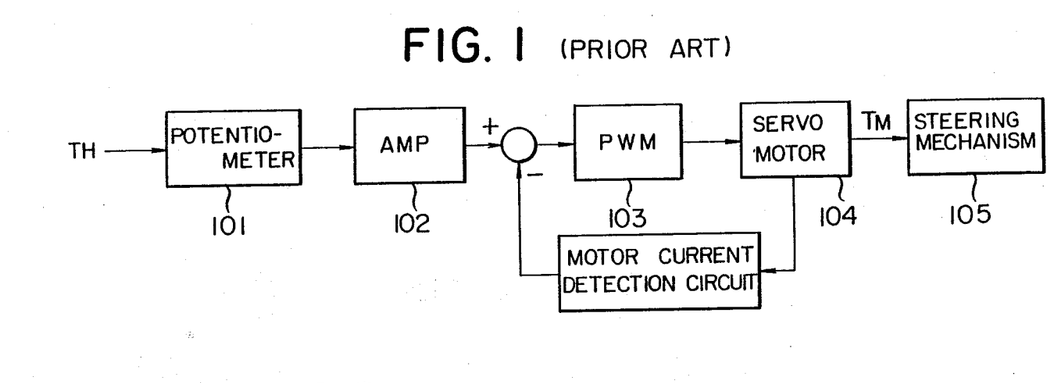
FIG. 1 is a block diagram showing a conventional electric control system.
Figure 2:
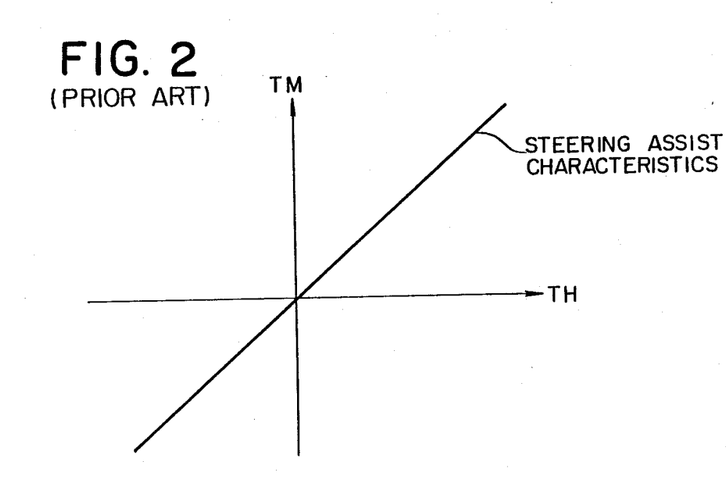
FIG. 2 is a chart showing conventional steering assist characteristics, wherein the steering TH and the steering assist force TM are plotted on the horizontal and vertical axes, respectively.

In the above steering control apparatus, when the steering wheel of the fork lift truck is driven into partial rotation, the torque produced by the manipulation is sensed by a torque sensor and steering torque signals are generated to the controller from a potentiometer mounted to the torque sensor. The controller is designed and constructed for generating a drive power to a steering assist servo motor in accordance with prescribed steering assist characteristics determined on the basis of the torque signals generated from the potentiometer, and the steering assist force being generated from the servo motor to the steering mechanism. In the conventional controller shown in FIG. 1, the signal corresponding to the steering force TH as shown in FIG. 1 is generated from a potentiometer 101 and amplified in an amplifier 102. The amplified signal is modulated and controlled in, for example, a pulse width modulation control circuit (PWM) 102, which the generates a drive output to the servo motor 104 on the basis of the pulse width modulation control and the feedback control. The servo motor 104 then generates a steering assist force to a steering mechanism 105 on the basis of the linear steering assist characteristics as indicated in FIG. 2.

Figure 10:
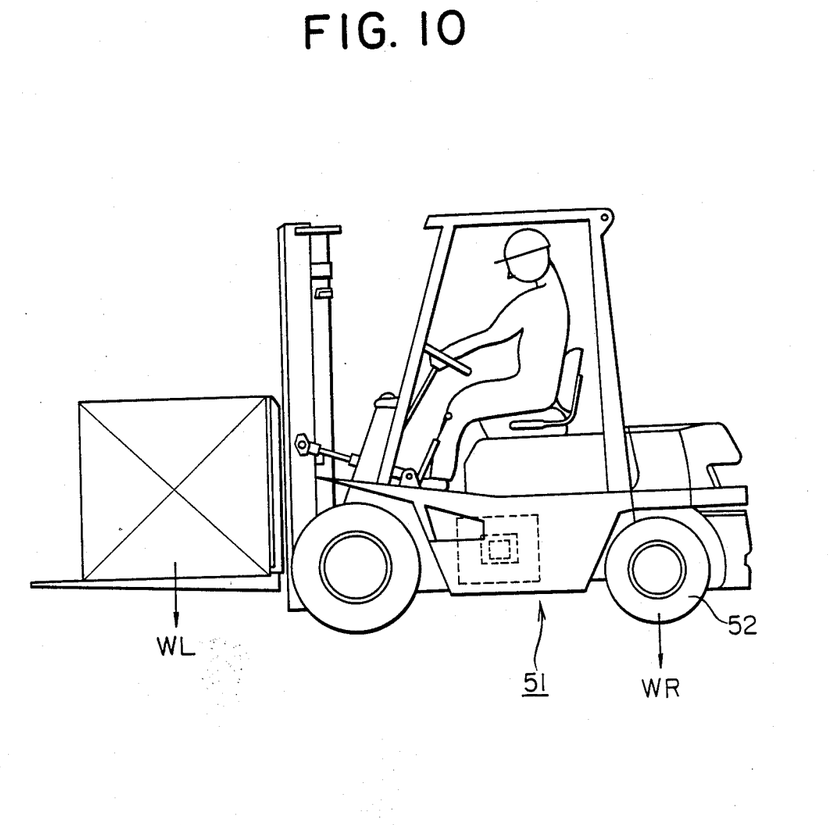
FIG. 10. shows diagrammatically the fork lift truck being steered with a load placed thereon.

The above described electrically driven power steering contrtol device generates a steering assist force TM with linear steering assist characteristics, as indicated in FIG. 1. It is noted that, in this connection, the larger load WL placed on the fork lift truck 51, the more the rear wheels 52 tend to be urged upward as shown in FIG. 10, whereby the load WR thereof becomes smaller, and a driving torque for a driving thereof becomes smaller. Thus the conventional electrically driven power steering control device has a drawback that, since the steering assist characteristics remain constant despite changes in the load weight, the operator will feel the handling too light in steering for a larger load WL or for a higher traveling speed of the fork lift truck, so that the operator will have only an unstable feeling in operating the truck.

SUMMARY OF THE INVENTION

It is therefore a principle object of the present invention to provide a control apparatus for an electrically driven power steering system for a fork lift truck wherein the operator may have a constant and stable handling feel in steering by determining a steering assist characteristics according to the load weight on a fork lift truck or the load weight and the speed thereof and generating a steering assist power TM in response to said determined steering assist characteristics even when the load weight and/or the traveling speed of the truck is changed.

It is another object of the present invention to provide such control apparatus which is simple in structure and low in manufacture costs.

The control apparatus for an electrically driven power steering system for a fork lift truck according to a preferred embodiment of the present invention is designed and arranged so that the steering assist force is generated from a steering assist electric motor when a steering wheel of the fork lift truck is rotated for steering the fork lift truck. The control apparatus includes a torque sensor adapted for generating a torque signal corresponding to a steering torque applied to said steering shwwl. The control apparatus also includes a load weight sensor adapted for sensing the weight of the load placed on the fork lift truck for generating the load weight signal corresponding to the load weight, and a control circuit adapted for determining steering assist characteristics based on said torque signals supplied thereto from said torque sensor and said load signal generated from said weight sensor and generating the drive power to said steering assist motor in accordance with the thus determined steering assist characteristics.

The control apparatus for an electrically driven power steering system for a fork lift truck according to another embodiment of the present invention is designed and arranged so that the steering assist force is generated from a steering assist electric motor when a steering wheel of a fork lift truck is rotated for steering the fork lift truck. The control apparatus includes a torque sensor adapted for producing a torque signal corresponding to a steering torque applied to said steering wheel, a load weight sensor adapted for sensing the weight of the load placed on the fork lift truck for generating the load weight signal corresponding to the load weight, a truck speed sensor for sensing the running speed of the truck and generating the speed signal corresponding to the truck speed, and a control circuit adapted for determining steering assist characteristics based on said torque signals supplied thereto from said torque sensor, said load weight signals supplied thereto from said load weight and said speed signal supplied thereto from said truck speed sensor and for generating the drive power to said steering assist motor in accordance with the thus determined steering assist characteristics.

With the above described control apparatus for the electrically driven power steering system for the fork lift truck of the present invention, when the driver manipulates the steering wheel to turn the steering wheel for steering the fork lift truck, with the goods of the load weight WL placed thereon, torque signals corresponding to the steering torque are generated from the torque sensor. Further, the load signals are generated form the load weight sensor. The torque signals and the load weight signals are supplied to the control circuit which then determines steering assist characteristics in accordance with the respective input signals to then generate a driving electric power to the steering assist motor in accordance with the determined steering assist characteristics for assisting the steering.

When the speed sensor is provided to the fork lift truck for generating the speed signals, steering assist characteristics are determined in accordance with the torque signals, load weight signals and the speed signals, and the driving electric power is generated from the control circuit to the steering assist motor in accordance with the thus determined steering assist characteristics for assisting the steering.

In accordance with the first embodiment of the present invention, the steering assist characteristics are determined in accordance with the weight of the load placed on the fork lift truck and the running speed of the truck, such that a large steering assist force is generated when there is no load on the truck and a large steering torque is required, while a small steering assist force is generated when a small steering force suffices because the load is placed on the truck. In such a manner, the handling manipulation is stabilized and a steering may be performed with a better steering feel.

When the vehicle speed sensor is provided in accordance with the second embodiment of the present invention, the running speed of the truck is simultaneously considered in determining the steering assist force such that the operator driving the truck may feel light resistance when the truck is running at a low speed and feel heavy resistance when the truck is running at a higher speed, thus providing a still better steering feel.

DESCRIPTION OF THE INVENTION

Referring to the accompanying drawings, there is shown a preferred embodiment according to the present invention.

Figure 3:
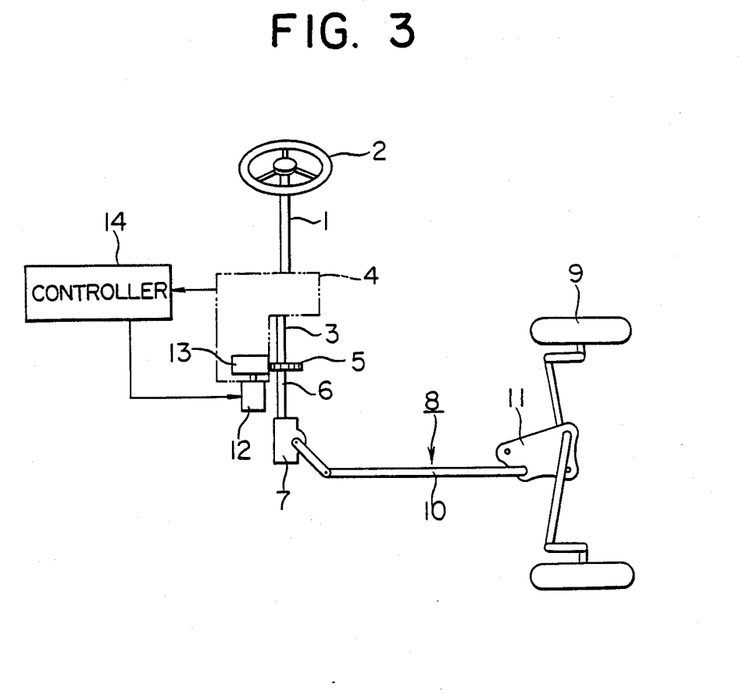
FIG. 3 shows diagrammatically the control apparatus for the electrically driven power steering system for a fork lift according to the present invention.

FIG. 3 illustrates an electrical power steering unit of a counter-balance type fork lift truck. In the drawing, the numeral 1 denotes a first shaft to which a steering wheel 2 is secured. The numeral 3 denotes a second shaft connected to the first shaft 1 via a spring coupling 4. The second shaft 3 is connected to a steering mechanism 8 through a gear 5, a transmission shaft 6 and a gearbox 7. A steering drive wheel 9 is attached to the steering mechanism 8 through a link 10 and a bell crank 11. The numeral 12 denotes a servo motor for steering, which is adapted to drive the second shaft 3 into rotation through a speed reducing gearing 13 and a gear 5 under the commands given by a controller 14 as later described.

For detecting the steering torque applied to the steering wheel 2, a torque detecting unit disclosed in the aforementioned Japanese Laid-Open Utility Model Publication No. 107682/1986 corresponding to U.S. Pat. No. 4,676,331 and shown in FIG. 4 herein is employed. This torque detecting unit operates in such a way that, when the first shaft is partially rotated towards left or right in FIG. 3, a spring 4a of the spring coupling 4 is twisted in dependence upon the force of manipulation applied to the steering wheel 2 within a prescribed angular extent, thus producing a relative angular deviation of, for example, about 5°, between the first shaft 1 and the second shaft 3. Within the extent of such relative angular deviation, a supporting shaft 16 is turned by way of a large gear 15 of the first shaft 1 and a pinion 17, while a roller 25 of the supporting shaft 16 thrusts the cylindrical cam 24 up or down, so that a cam shaft 26 of the cylindrical cam 24 is moved up or down in a vertically extending vertical slot 22 formed in the supporting shaft 22. When the gear ratio between the large gear 15 on the first shaft 1 and the pinion 17 and that between the large gear 19 on the second shaft 3 and the pinion 21 are set so as to be equal to each other, a rotational deviation equal to a number of times the gear ratio is produced between the supporting shaft 16 on the first shaft 1 and the supporting shaft 20 on the second shaft 3.

Figure 4:
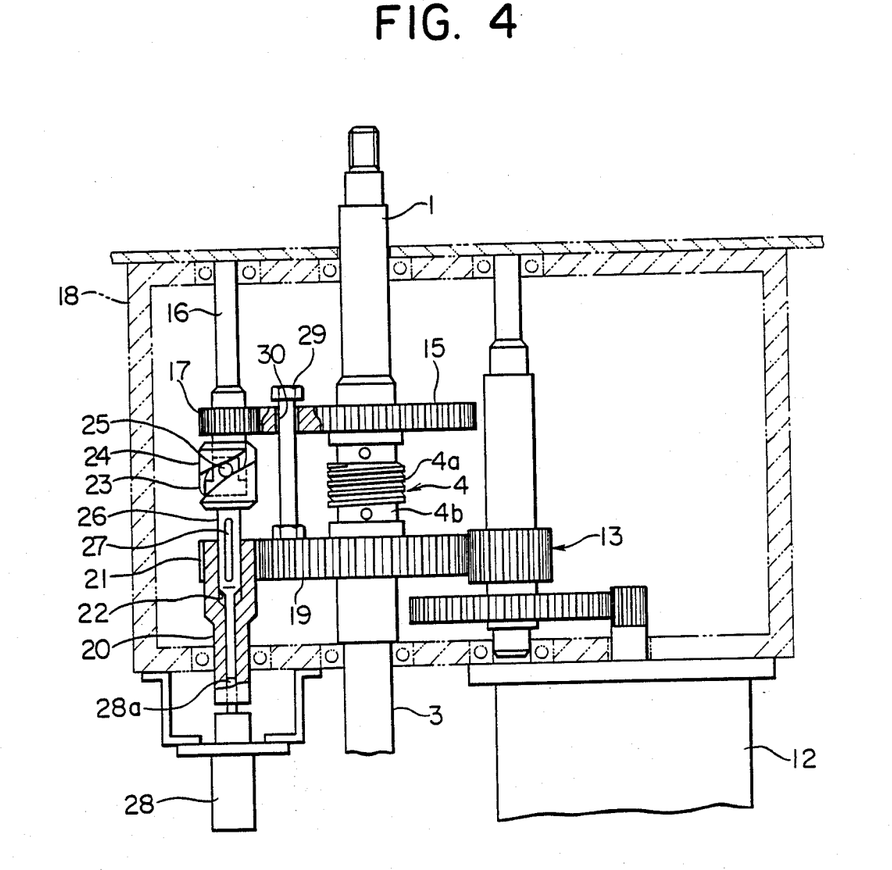
FIG. 4 is a side elevation, shown partially cross section, of a torque sensor employed in the control apparatus shown in FIG. 3.

The translational deviation of the cam shaft 26 is amplified in this manner and the so-amplified translational deviation is sensed by a potentiometer 28, the torque signals indicating the displacement and the direction thereof being inputted into the controller 14. Further, the potentiometer 28, a pressure sensor 55 for generating load signals corresponding to the load on the fork lift truck as later described and a speed sensor 71 for generating speed signals corresponding to the speed of the truck employed in another embodiment are connected to the controller 14. In such a manner, the servo motor 12 is driven under the commands of the controller 14 to cause the second shaft 3 to be rotated through the speed reducing gearing 13 and the gear 5 for driving the steering mechanism 8 so as to turn the steering drive wheel 9 towards right or left. With the above construction, a torque signal corresponding to the linear displacement of the cam shaft 26 supplied from the potentiometer 28, the aforementioned load signal and, in the second embodiment, as later described, the speed signals are introduced into the controller 14 which is adapted to supply driving electric power to the servo motor 12 to cause its rotation to generate the steering assistive force in manipulating the steering wheel 2.

Referring to FIGS. 5 to 8, a first embodiment of an electrically driven power steering control system for a fork lift truck making use of the above described torque sensor is explained.

Figure 5:
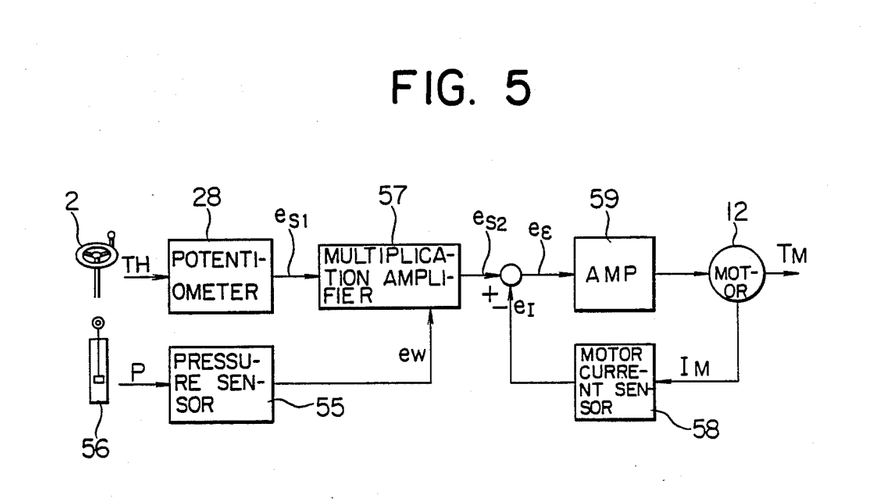
FIG. 5 is a block diagram showing an electric control system according to a first embodiment.

FIG. 5 is a block diagram showing the first embodiment in its entirety wherein a steering force TH produced when the operator mainipulates the steering wheel as described above is sensed by the torque sensor and a torque signal esl corresponding to the steering force TH is generated from the potentiometer 28. On the other hand, for sensing the load when the goods are placed on the truck fork, a pressure sensor 55 is provided for sensing the hydraulic force P of a hydraulic light cylinder 56 adapted for lifting and lowering the fork, and a load signal eW corresponding to the hydraulic pressure P proportionate to the load is generated from the pressure sensor 55.

Figure 7:
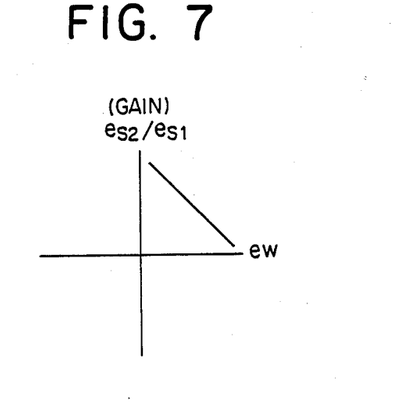
FIGS. 7 and 8 are charts showing steering assist characteristics, wherein the steering force TH and the steering assist force TM are plotted on the horizontal and vertical axes respectively.

The torque signal esl and the load signal eW are amplified at a multiplication amplifier 52 from which an amplified signal es2 is generated. The gain es2/es1 of the multiplication amplifer 57 is controlled such that, as shown in FIG. 7, the gain es1/es2 becomes smaller as the magnitude of the load signal eW becomes larger, that is, as the weight of the goods placed on the truck fork becomes larger.

The output signal es2 of the multiplication amplifier 57 is summed with an output signal el of a motor current sensor 58 sensing the drive current IM of the servo motor 12 for steering assistance, that is, the feedback signal, for generating a control signal eϵ after summing with the feedback signal. This control signal eϵ is applied to an amplifier 59 generating a driving electrical power to the servo motor 12 by pulse width modulation of the input control signal eϵ to drive the servo motor 12 for generating the steering assistive force TM to the steering mechanism.

Figure 6:
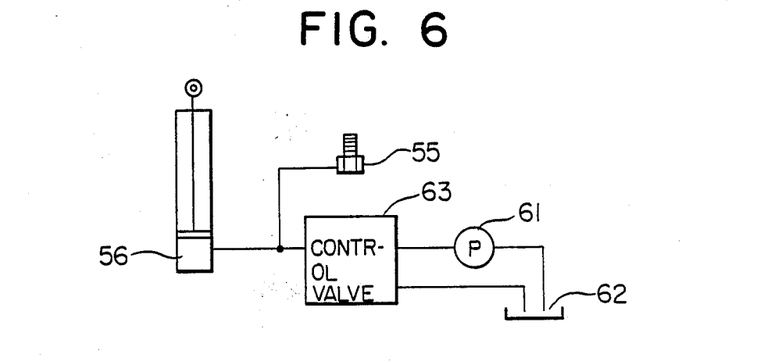
FIG. 6 shows diagrammatically the hydraulic pressure sensor system.

FIG. 6 illustrates the system for sensing the hydraulic pressure developed by the lift cylinder 56. As shown therein, the pressure oil is sucked by a hydraulic pump 61 from an oil tank 62 to supply the pressure oil to the lift cylinder 56 through the control valve 63 to actuate the lift cylinder 56 for placing the goods on the truck fork. The pressure P of the pressure oil prevailing at the time the fork is stopped at the desired height is sensed by the pressure sensor 55 which then generates the aforementioned load signal eW.

Figure 8:
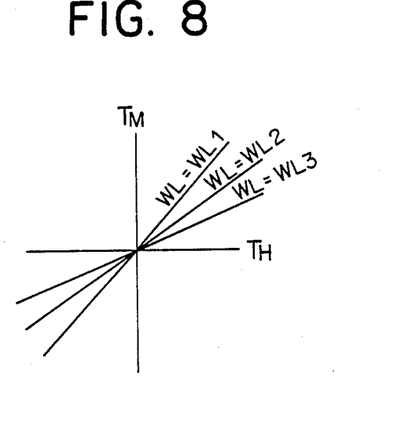

With the above described control arrangement, the steering assistive force TM generated from the servo motor 12 when the steering wheel 2 is actuated by the steering force TH is controlled in accordance with the steering assist characteristics determined by the weight WL of the load placed on the fork, as indicated in the diagram of FIG. 8. The load weight WL shown in FIG. 8 is in the order of relative magnitude of WL1<WL2<WL3. In accordance with such order of magnitude of the weight load WL, the steering assist force TM becomes larger for the load weight WL1 on the fork and becomes smaller for the load weight WL3.

Figure 9:
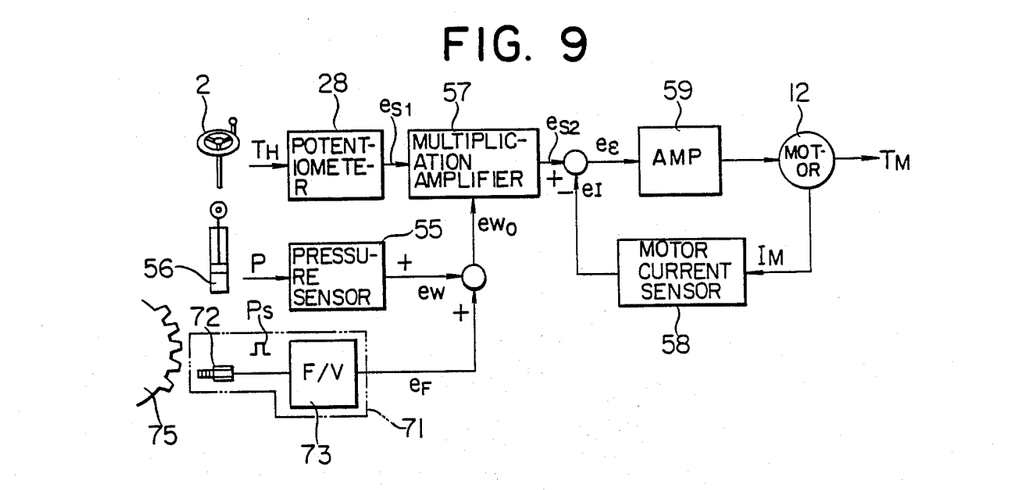
FIG. 9 is a block diagram showing an electric control system according to a second embodiment.

Referring to FIG. 9, a second embodiment of the electrically driven power steering control system for a fork lift truck making use of the above described torque sensor is explained.

It is seen from FIG. 9 that, in the present second embodiment, the speed sensor 71 adapted for sensing the traveling speed of the truck is annexed to the overall control system of the first embodiment shown in FIG. 5. Thus in the present second embodiment, the steering assist force is decreased with the increase in the traveling speed of the fork lift truck so that the operator will feel greater resistance, so that the stability in handling is improved. The speed sensor 71 is comprised of a proximity switch 72 adapted for sensing the teeth of a suitable gear 75 that is rotated during the running of the fork lift truck for generating interrupted pulse signals PS and an F/V conversion circuit 73 for receiving and converting the pulse signal PS into analog signals. The speed signal eF generated from the F/V (frequency voltage) conversion circuit 73 is summed with the load signal eW generated from the pressure sensor 55 and the resulting sum signal eWO is introduced into the multiplication amplifer 57. The multiplication amplifer 57 has characteristics such that the gain thereof is changed with the signal eWO, so that, when the weight of the goods on the fork remains constant, the gain thereof becomes smaller with increase in the traveling speed of the fork lift truck.

The output signal es2 of the multiplication amplifer 57 is summed to the signal eI from the motor current sensor 58 to generate the control signal eϵ, similarly to the preceding first embodiment, this signal eϵ is applied to the amplifier 59 which then supplies the driving power corresponding to the signal eϵ to the servo motor 12 which then generates the steering assist force TM based on steering assist characteristics determined by the load weight and the truck speed.

In the above described first and second embodiments, the control circuit may be designed as an analog control circuit or as a digital control of a microcomputer by partially changing the circuit configuration.

What is claimed is:

1. In fork lift truck steering control apparatus, said truck having at least one supporting, front wheel, a vertically movable, load receiving truck fork in front of said front wheel, a rear, supporting steerable wheel at the side of said front wheels opposite from said truck fork and a manually operable steering wheel, an electrically driven power steering system connected to said rear steerable wheel for providing a steering assist force by means of a steering assist electric motor when said steering wheel of the fork lift truck is rotated for steering the fork lift truck, said control apparatus comprising:

a torque sensor for generating a torque signal corresponding to a steering torque applied to said steering wheel the improvement comprising:
a load weight sensor controlled by the weight of a load placed on the truck fork for generating a load weight signal corresponding to the load weight on said truck fork; and
a control circuit connected to said torque sensor and said load weight sensor for determining steering assist characteristics based on both the torque signals supplied thereto from the torque sensor and load weight signals supplied thereto from the load weight sensor and connected to said steering assist motor for supplying drive power to said steering assist motor in an amount which will provide a large steering assist force when there is no load on the truck fork and a small steering assist force when there is a load on the truck fork.

2. Fork lift truck steering control apparatus according to claim 1 and including:
a truck speed sensor on said truck for sensing running speed of the truck and generating a speed signal corresponding to the truck speed;
and wherein said control circuit is also connected to said truck speed sensor and responsive said speed signal from the truck speed sensor and supplies drive power to said steering assist motor in an amount which will provide a decreased steering assist force when the speed of the truck increases.

3. A control apparatus as claimed in claim 2, said torque sensor comprising a potentiometer, said load weight sensor comprising a pressure sensor, and said truck speed sensor comprising a proximity switch for sensing a gear portion of a gear member and generating pulse signals and a frequency to voltage conversion circuit for converting said pulse signals to analog signals.

4. A control apparatus as claimed in claim 1 wherein said torque sensor comprises a potentiometer and said load weight sensor comprises a pressure sensor.

5. A fork lift truck steering controlling system, said truck having at least one supporting, front wheels, a vertically movable, load receiving truck fork in front of said front wheels, a rear, supporting steerable wheel at the side of said front wheels opposite from said truck fork and a manually operable steering wheel, siad system comprising an electrically driven power steering system connected to said rear steerable wheel for providing steering assist power when said steering wheel is rotated, a torque sensor means for providing a torque signal corresponding to torque applied to said steering wheel of the fork lift truck a load weight sensor means controlled by the weight of the load on said truck fork for providing a load weight siganl and a control circuit connected to said torque sensor means and said load weight sensor means and responsive to said torque signal and said load weight signal and connected to said electrically driven power steering system for providing a large amount of steering assist power when there is no load on the truck fork and for providing a small amount of steering assist power when there is a load on the truck fork.

6. The system of claim 5 and also including truck speed sensor means for providing a speed signal corresponding to the speed of the fork lift truck, said control circuit also being connected to said speed sensor means and responsive to said speed signal for decreasing the amount of steering assist power as the speed of the fork lift truck increases.

7. The system of claim 5 or 6 wherein the torque sensor means comprises a potentiometer and the load weight sensor means comprises a pressure sensor.

8. The system of claim 6 wherein the torque sensor means comprises a potentiometer, the load weight sensor means comprises a pressure sensor, and the truck speed sensor means comprises a proximity switch for sensing the position of teeth of a toothed gear rotating at a rate proportional to the truck speed, means for generating pulse signals in response to operation of said proximity switch and means for converting said pulse signals into analog signals.

* * * * *